(12) United States Patent
Leboisne

(10) Patent No.: US 7,383,928 B2
(45) Date of Patent: Jun. 10, 2008

(54) PARKING BRAKE FOR A VEHICLE WITH BRAKE BOOSTER

(75) Inventor: Cedric Leboisne, Le Perreux sur Marne (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/525,047

(22) Filed: Sep. 22, 2006

(65) Prior Publication Data
US 2007/0158999 A1    Jul. 12, 2007

(30) Foreign Application Priority Data
Sep. 27, 2005   (DE)   ............ 10 2005 046 046

(51) Int. Cl.
   *B60T 17/16*   (2006.01)
(52) U.S. Cl. ............... 188/265; 188/158; 180/287; 303/89
(58) Field of Classification Search ........ 188/158–162, 188/265; 303/3, 7, 20, 127, 89; 180/287
See application file for complete search history.

(56) References Cited

U.S. PATENT DOCUMENTS

| | | | | |
|---|---|---|---|---|
| 3,552,518 A | * | 1/1971 | Aidner et al. ............... | 180/287 |
| 3,572,472 A | * | 3/1971 | Black ......................... | 188/170 |
| 3,747,337 A | * | 7/1973 | Gardner et al. ............... | 60/534 |
| 5,477,939 A | * | 12/1995 | Childress .................... | 180/287 |
| 2004/0040799 A1 | * | 3/2004 | Schumann et al. ......... | 188/158 |
| 2005/0092563 A1 | * | 5/2005 | McCann et al. ............ | 188/265 |
| 2005/0258683 A1 | * | 11/2005 | Yamaguchi .................. | 303/89 |
| 2005/0275282 A1 | * | 12/2005 | McCann ..................... | 303/127 |
| 2006/0197376 A1 | * | 9/2006 | Herbst ........................ | 303/127 |
| 2006/0232125 A1 | * | 10/2006 | Thomas ........................ | 303/7 |
| 2006/0279136 A1 | * | 12/2006 | Haeussler et al. ............ | 303/20 |

* cited by examiner

*Primary Examiner*—Christopher P Schwartz
(74) *Attorney, Agent, or Firm*—Ronald E. Greigg

(57) ABSTRACT

A parking brake for a vehicle, including a parking brake unit, an actuating device situated inside the vehicle and operable to transmit an actuation signal to a control unit, a hydraulic circuit of a service brake of the vehicle connected to the parking brake unit, and an actuator and locking device for locking the parking brake in a braking position; the parking brake is actuatable by means of the hydraulic circuit and the actuator is a brake booster of the service brake.

20 Claims, 2 Drawing Sheets

PARKING BRAKE FOR A VEHICLE WITH BRAKE BOOSTER

CROSS REFERENCE TO RELATED APPLICATIONS

This application is based on German Patent Application 10 2005 046 046.1 filed on 27 Sep. 2005, upon which priority is claimed.

BACKGROUND OF THE INVENTION

1. Field of the Invention

The invention relates to a parking brake for a vehicle with brake booster.

2. Description of the Prior Art

A wide variety of designs of parking brakes (hand brakes) for vehicles are known from the prior art. Most recently, power-assisted parking brakes have come into use, which eliminate the need for a hand brake lever inside the vehicle and instead, the parking brake is actuated by means of a button or switch. Proposals have been made in this connection to integrate the parking brake into a service brake of the vehicle. When the parking brake is to be engaged, a pump that is provided in the service brake circuit, e.g. an ESP pump, is activated in order to execute the engaging action and a locking device can then lock the parking brake in the braking position, thus holding the vehicle in place. To release the parking brake, the pump of the service brake must be activated again in order to release the locking device, thus releasing the parking brake after the pump is switched off and the pressure in the brake circuit has been reduced. In systems of this kind, however, it is disadvantageous that the pump of the service brake circuit generates a very high level of noise. Since parking brakes are usually engaged when the vehicle is stationary, particularly when the engine is also switched off, an unpleasant noise can be heard in the passenger compartment. This can give the driver the impression that a malfunction of the parking brake has occurred.

OBJECT AND SUMMARY OF THE INVENTION

The parking brake for a vehicle according to the present invention, has the advantage over the prior art that it does not generate any undesirable noise in order to actuate the parking brake, i.e. to engage and release the parking brake. According to the present invention, it is possible in this context to eliminate the activation of a pump in the hydraulic circuit of the service brake. According to the present invention, the parking brake is actuated via a brake booster of the service brake. The use of the brake booster does not generate any undesirable noise when engaging or releasing the parking brake. In addition, the parking brake according to the present invention consequently has a very small number of components since it is no longer necessary to provide a separate pump for actuating the parking brake. The parking brake according to present invention is able to make use of components that are already present in the vehicle. Moreover, the parking brake according to the present invention can also be used in service brakes that are not equipped with any electronic braking systems such as ESP, ABS, TCS, etc. since the parking brake does not require the pumps of such braking systems in order to operate.

Preferably, the actuator is a vacuum brake booster. Brake boosters of this kind have a proven track record and are relatively inexpensive.

In order to be independent from an engine operation of the vehicle, a vacuum generation device is preferably provided, which generates a vacuum in the vacuum chamber of the vacuum brake booster.

Preferably, the vacuum generation device is a vacuum reservoir and/or a suction pump that can be driven by means of an electric motor. This makes it possible to generate a vacuum independent of an operation of the motor so that the parking brake can be engaged at any time. The current for driving the electric motor is preferably drawn from a vehicle battery or a separate battery for the electric motor.

In order to assure that a pressure in the hydraulic circuit is sufficient to hold the vehicle in place, a pressure sensor is preferably provided in the hydraulic circuit.

Another possibility of detecting whether a pressure is sufficient to hold the vehicle in place can be carried out by detecting a pressure in the vacuum chamber of the vacuum brake booster. The pressure in the vacuum chamber can be detected in addition to the detection of the pressure in the hydraulic circuit or can itself be used as an indicator for the holding of the vehicle.

The parking brake according to present invention preferably also includes a force sensor for detecting an engaging force of the parking brake. The force sensor can act on its own or in combination with the other sensors explained above to monitor the engagement of the parking brake.

Preferably, a locking device, which serves to lock a parking brake in a braking position, includes a manual emergency release device. The emergency release device makes it possible to release the parking brake from its locked state.

BRIEF DESCRIPTION OF THE DRAWINGS

The invention will be better understood and further objects and advantages thereof will become more apparent from the ensuing detailed description of preferred embodiments, taken in conjunction with the drawings, in which.

DESCRIPTION OF THE PREFERRED EMBODIMENTS

Figure 1:
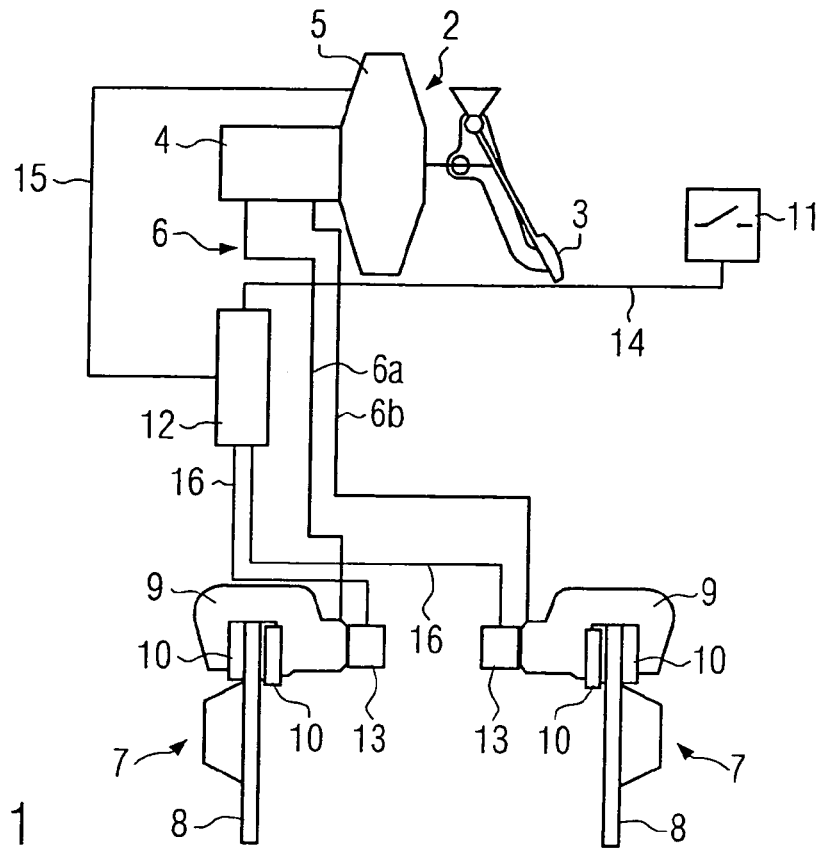
FIG. 1 is a schematic view of a parking brake according to a first exemplary embodiment of the present invention.

A parking brake 1 according to a first exemplary embodiment of the present invention will be described below in conjunction with FIG. 1, in which the parking brake 1 is integrated into the normal service brake of the vehicle. FIG. 1 shows two wheel brakes 7 of the vehicle. For the sake of better visibility, the other wheel brakes of the vehicle are not shown. The wheel brakes 7 each have a brake disc 8, a brake caliper 9, and brake pads 10. In addition, a brake booster 2 is provided, which, during the normal operating state of the vehicle, boosts a braking force that a driver introduces into the brake booster 2 by means of a pedal 3. The brake booster 2 is a vacuum brake booster and has a master cylinder 4 and a vacuum booster 5. The master cylinder 4 is connected to the wheel brakes 7 by means of lines 6a, 6b via the hydraulic circuit 6 of the service brake.

The parking brake 1 also includes a locking device 13 on each wheel brake 7. The locking device 13 serves to lock the wheel brakes 7 in a parking brake position. In this exemplary embodiment, the normal wheel brakes of the service brake are simultaneously also used as the parking brake. This permits a significant reduction in the number of components required for the parking brake.

A control unit 12 of the parking brake controls or regulates the engagement and releasing of the parking brake. As is clear from FIG. 1, the control unit 12 is connected to an actuating device 11 via a line 14. The actuating device 11 is situated inside the vehicle and is embodied, for example, in the form of a button or switch for actuating the parking brake. The control unit 12 is also connected via a line 15 to the vacuum booster 5 of the brake booster. In addition, the control unit 12 is respectively connected via a line 16 to the locking device 13 of the parking brake. The locking device 13 serves to mechanically lock a parking brake position in order to prevent the parking brake from being released. The locking device 13 includes an electric motor, which drives a spindle unit, optionally via a transmission. The spindle unit converts the rotary motion of a spindle into a longitudinal motion of a nut so that the nut can mechanically lock the parking brake in a braking position.

The parking brake according to the present invention functions as follows: when a driver wishes to engage the parking brake, he actuates the actuating device 11 inside the vehicle. As a result, a corresponding signal is transmitted to the control unit 12 via the line 14. The control unit 12 recognizes the driver's wish to engage the parking brake and sends a corresponding signal to the vacuum booster 5 via the line 15. This activates the vacuum booster 5 so that the generation of a vacuum causes a hydraulic pressure to build up in the hydraulic circuit 6 of the service brake. The buildup of pressure in the hydraulic circuit causes the pressure to also travel to the wheel brakes 7 via the lines 6a and 6b. This pushes the brake pads 10 of the wheel brakes 7 against the brake disc 8. The pressure buildup generated by the vacuum booster 5 corresponds to the pressure buildup during a normal braking action of the service brake in order to assure that the brake pad 10 rests against the brake disc 8 with a sufficient amount of braking force. Then, the control unit 12 activates the locking devices 13 of the wheel brakes 7 via the lines 16, causing them to mechanically lock the brake pads 10 in position against the brake disc 8. This engages the parking brake. Since the brake pads 10 are now mechanically locked by means of the locking device 13, a brake force is generated that is sufficient to hold the vehicle in place. The hydraulic pressure in the hydraulic circuit 6 can therefore be reduced again. The control unit 12 is thus able to monitor whether the parking braking position is mechanically locked in place, for example by monitoring a current or voltage consumption of the electric motor of the locking device 13.

If the parking braking position should be released again, then the actuating device 11 is actuated again and a corresponding signal is transmitted to the control unit 12 via the line 14. The control unit 12 once again activates the vacuum booster 5 via the line 15 so that a pressure is once again built up in the hydraulic circuit 6. This pressure buildup in the hydraulic circuit 6 now makes it possible for the locking device 13 of the wheel brake 7 to be released again. After the corresponding pressure has built up in the hydraulic circuit 6, the control unit 12 transmits a corresponding signal to the locking device 13 via the line 16. For example, this causes the electric motor to operate in the opposite direction, thus releasing the mechanical locking of the parking braking position and resetting the locking device 13 into its initial position. This can also be facilitated if need be with the assistance of a spring element.

If the locking device 13 has released the parking braking position, then the pressure in the hydraulic circuit 6 can be reduced again and the parking brake is finally released.

According to the present invention, a vacuum brake booster 2 already present in the vehicle is used to operate the parking brake, i.e. to engage and release the parking braking position. Consequently, the only additional components that must be provided for the parking brake according to the present invention are the locking device 13, the actuating device 11, and the corresponding connecting lines between these components and the control unit 12. The control unit 12 for the parking brake can, for example, also be integrated into a control unit already provided in the vehicle, e.g. a control unit of the brake system. According to the present invention, it is therefore not necessary to actuate a hydraulic pump or the like, which can cause an undesirable generation of noise. The vacuum required to operate the vacuum brake booster can be generated in a known fashion by the operation of the internal combustion engine. Alternatively, it is also possible for a separate vacuum reservoir to be provided, which is connected to the vacuum booster 5 when the parking brake is actuated, in order to provide the required vacuum. The vacuum in the vacuum reservoir can be generated, for example, during normal operation of the vehicle.

Figure 2:
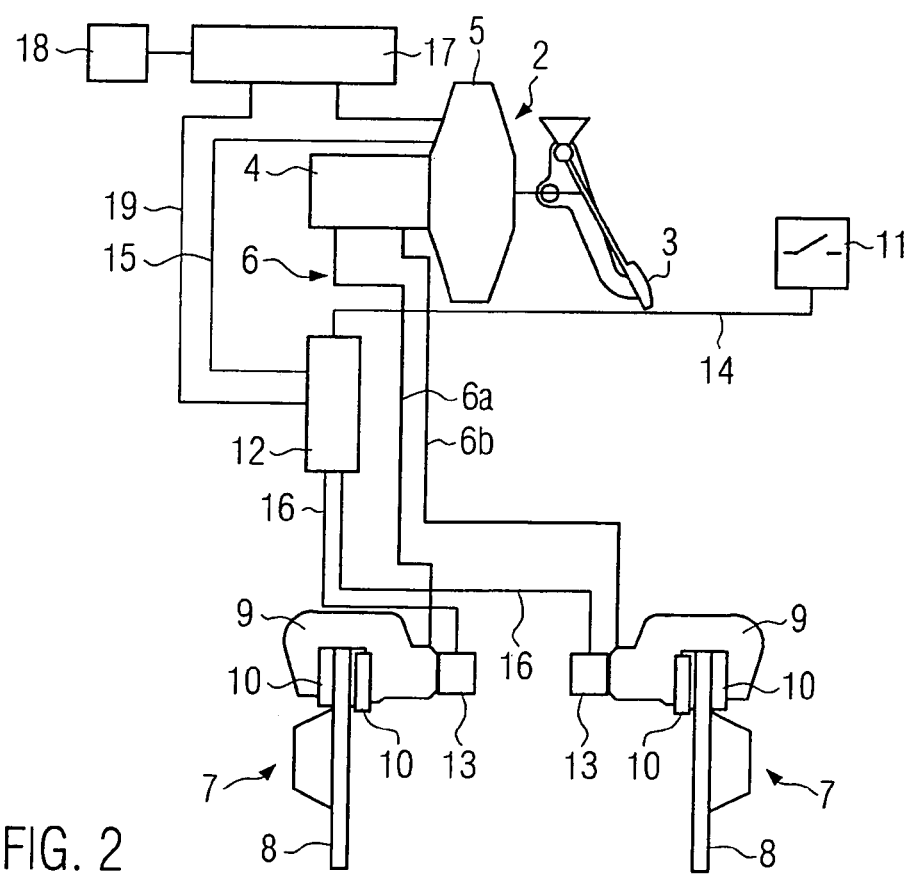
FIG. 2 is a schematic view of a parking brake according to a second exemplary embodiment of the present invention.

A parking brake 1 according to the second exemplary embodiment of the present invention will be described below in conjunction with FIG. 2. Parts that are the same or are functionally equivalent have been provided with the same reference numerals as in the first exemplary embodiment.

By contrast with the first exemplary embodiment, in the second exemplary embodiment, a separate vacuum pump 17 is provided. The vacuum pump 17 is driven by an electric motor 18. The vacuum pump 17 is activated by the control unit 12 via a line 19 and can therefore generate a vacuum in the vacuum booster 5, independent of whether the vehicle engine is running at the time. Otherwise, the second exemplary embodiment corresponds to the first exemplary embodiment, permitting reference to hereby be made to this prior description.

Figure 3:
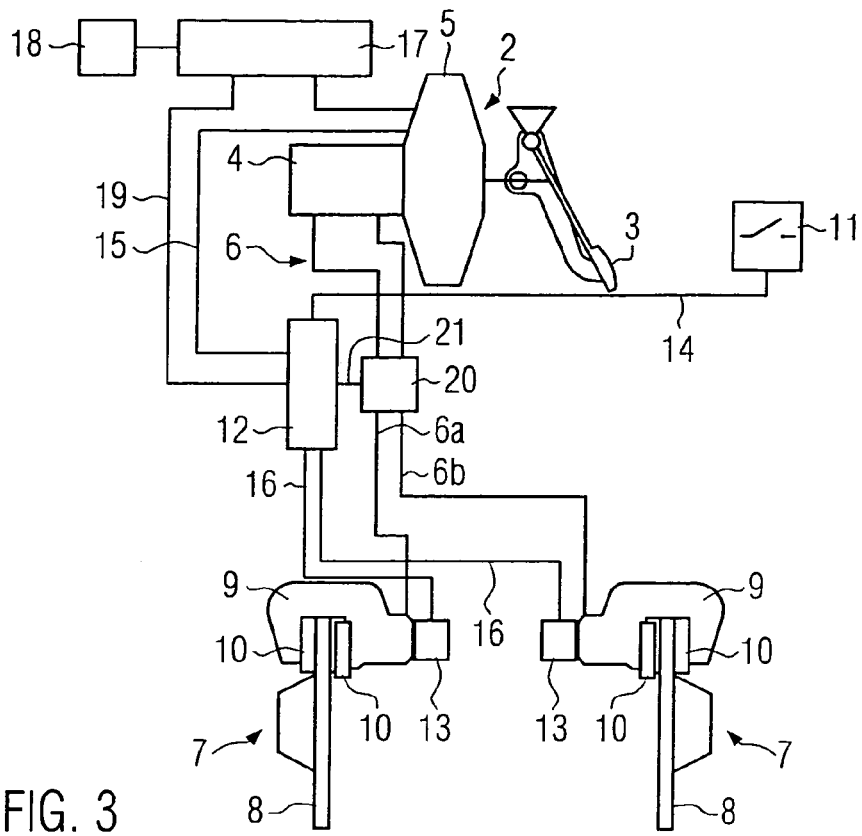
FIG. 3 is a schematic view of a parking brake according to a third exemplary embodiment of the present invention.

A parking brake 1 according to a third exemplary embodiment of the present invention will be described below in conjunction with FIG. 3. Parts that are the same or are functionally equivalent have been provided with the same reference numerals as in the preceding exemplary embodiments.

The third exemplary embodiment corresponds essentially to the second exemplary embodiment; by contrast with the second exemplary embodiment, in the third exemplary embodiment, the only additional component provided is a pressure sensor 20 in the hydraulic circuit 6. The pressure sensor 20 is connected to the control unit 12 via a line 21 and detects a pressure in the hydraulic circuit 6. The parking brake of the third exemplary embodiment thus includes a monitoring device for monitoring the pressure in the hydraulic circuit 6 while the parking brake is being engaged and while the parking brake is being released. This makes it possible to securely hold the vehicle in place. Otherwise, this exemplary embodiment corresponds to the preceding exemplary embodiments, permitting reference to hereby be made to these prior descriptions.

Figure 4:
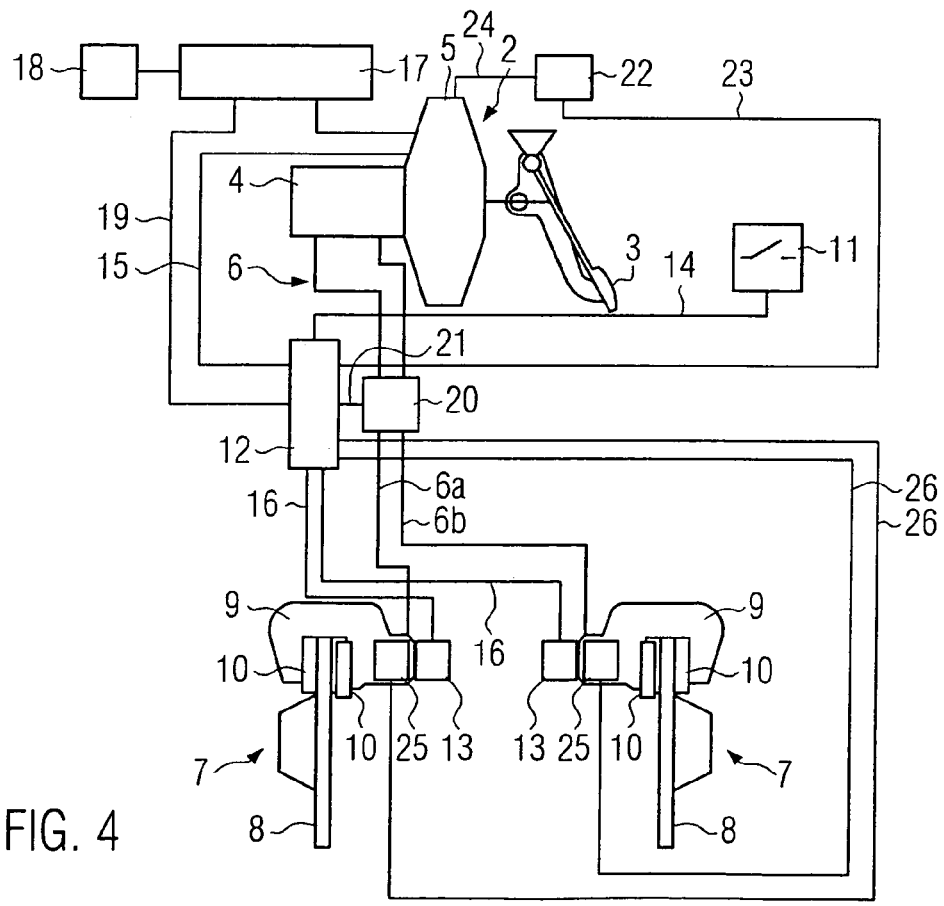
FIG. 4 is a schematic view of a parking brake according to a fourth exemplary embodiment of the present invention.

A parking brake according to a fourth exemplary embodiment of the present invention will be described below in conjunction with FIG. 4. The fourth exemplary embodiment essentially corresponds to the third exemplary embodiment;

by contrast with the third exemplary embodiment, a vacuum sensor 22 is also provided. The vacuum sensor 22 is connected to the vacuum booster 5 via a line 24 and detects the vacuum present in the vacuum booster 5. The vacuum sensor 22 is connected to the control unit 12 via a line 23 in order to supply the control unit 12 with the corresponding values. Based on the vacuum that is present in the vacuum booster 5, it is possible to draw a conclusion as to the pressure contained in the hydraulic circuit 6, meaning that the vacuum sensor 22 is also used for the monitoring of the pressure buildup in the hydraulic circuit 6.

The parking brake 1 of the fourth exemplary embodiment also includes a force sensor 25 in each of the wheel brakes 7. The force sensors 25 detect the engaging force for holding the vehicle in place that is present in each of the wheel brakes 7. The force sensors 25 can, for example, be strain gages or the like. Detecting the engaging force offers an additional possibility for monitoring the parking brake. The corresponding force values are transmitted via lines 26 to the control unit 12, which executes a corresponding evaluation, e.g. through comparison to stored values.

With regard to the parking brakes described in conjunction with FIGS. 3 and 4, which can be monitored by means of the pressure sensor 20 and/or the vacuum sensor 22 and/or the force sensor 25, it should be noted that the control unit can give the driver an acoustic and/or optical warning signal, for example when the pressure in the hydraulic circuit 6 falls below a predetermined value and/or when a pressure value in the vacuum booster 5 falls below a threshold value and/or when the engaging force in the wheel brake falls below a threshold value. This warning signal should notify the driver that the parking brake 1 has not been properly engaged. The above-described sensors can be provided in any arbitrary combination with one another.

The foregoing relates to preferred exemplary embodiments of the invention, it being understood that other variants and embodiments thereof are possible within the spirit and scope of the invention, the latter being defined by the appended claims.

I claim:

1. A parking brake for a vehicle comprising:
    a brake booster (2) connected to a driver brake pedal (3);
    at least one vehicle wheel brake (7) connected to said brake booster (2) via a hydraulic circuit (6);
    a locking device (13) connected to and for locking said at least one wheel brake in a braking position;
    a control unit (12) for controlling the brake booster (2) and the locking device (13); and
    an actuating device (11) for the control unit (12) which a driver activates from inside the vehicle upon engaging or releasing the parking brake,
    said control unit controlling said brake booster to pressurize said hydraulic circuit to said at least one wheel brake and controlling said locking device to then to lock said at least one wheel brake upon the driver activating the actuating device to engage the parking brake.

2. The parking brake according to claim 1, wherein the brake booster is a vacuum brake booster (5).

3. The parking brake according to claim 2, further comprising a vacuum generating device (17) connected to a vacuum chamber of the vacuum brake booster (5).

4. The parking brake according to claim 3, wherein the vacuum generating device (17) is a vacuum reservoir and/or a suction pump that is drivable by means of an electric motor (18).

5. The parking brake according to claim 4, further comprising a pressure sensor (20) connected in the hydraulic circuit in order to detect a hydraulic pressure during an actuation of the parking brake.

6. The parking brake according to claim 4, further comprising a pressure sensor (22) for detecting a pressure in the vacuum chamber of the brake booster.

7. The parking brake according to claim 4, further comprising a force sensor (25) for detecting an engaging force of the parking brake.

8. The parking brake according to claim 3, further comprising a pressure sensor (20) connected in the hydraulic circuit in order to detect a hydraulic pressure during an actuation of the parking brake.

9. The parking brake according to claim 3, further comprising a pressure sensor (22) for detecting a pressure in the vacuum chamber of the brake booster.

10. The parking brake according to claim 3, further comprising a force sensor (25) for detecting an engaging force of the parking brake.

11. The parking brake according to claim 2, further comprising a pressure sensor (22) for detecting a pressure in the vacuum chamber of the brake booster.

12. The parking brake according to claim 11, further comprising a force sensor (25) for detecting an engaging force of the parking brake.

13. The parking brake according to claim 2, further comprising a pressure sensor (20) connected in the hydraulic circuit in order to detect a hydraulic pressure during an actuation of the parking brake.

14. The parking brake according to claim 2, further comprising a force sensor (25) for detecting an engaging force of the parking brake.

15. The parking brake according to claim 1, further comprising a pressure sensor (20) connected in the hydraulic circuit in order to detect a hydraulic pressure during an actuation of the parking brake.

16. The parking brake according to claim 15, further comprising a pressure sensor (22) for detecting a pressure in the vacuum chamber of the brake booster.

17. The parking brake according to claim 15, further comprising a force sensor (25) for detecting an engaging force of the parking brake.

18. The parking brake according to claim 1, further comprising a force sensor (25) for detecting an engaging force of the parking brake.

19. The parking brake according to claim 1, wherein the locking device further comprises a manual emergency release device in order to release the parking brake from the locked state.

20. A brake system of a vehicle, including a parking brake according to claim 1.

* * * * *